(12) United States Patent
Kleuker

(10) Patent No.: US 8,267,208 B2
(45) Date of Patent: Sep. 18, 2012

(54) DRIVE UNIT FOR A HYBRID VEHICLE AND METHOD OF ASSEMBLY

(75) Inventor: Christoph Kleuker, Schweinfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 467 days.

(21) Appl. No.: 12/508,746

(22) Filed: Jul. 24, 2009

(65) Prior Publication Data
US 2010/0187028 A1 Jul. 29, 2010

(30) Foreign Application Priority Data
Jul. 25, 2008 (EP) .................................. 08161178

(51) Int. Cl.
*B60K 6/38* (2007.10)

(52) U.S. Cl. .................... 180/65.22; 180/65.6; 903/912; 477/3

(58) Field of Classification Search ............... 280/65.22, 280/65.25, 65.6; 903/912, 914; 180/65.22, 180/65.25, 65.6, 65.21; 477/3, 5, 6
See application file for complete search history.

(56) References Cited

U.S. PATENT DOCUMENTS

| | | | | |
|---|---|---|---|---|
| 5,691,588 A | * | 11/1997 | Lutz et al. | 310/92 |
| 5,755,302 A | * | 5/1998 | Lutz et al. | 180/65.21 |
| 6,294,854 B1 | * | 9/2001 | Grosspietsch et al. | 310/92 |
| 6,814,204 B2 | * | 11/2004 | Diemer et al. | 192/48.8 |
| 2003/0234150 A1 | | 12/2003 | Orlamunder et al. | |
| 2008/0113846 A1 | * | 5/2008 | Wiggen et al. | 477/3 |

FOREIGN PATENT DOCUMENTS

| | | |
|---|---|---|
| DE | 1 112 673 | 8/1961 |
| DE | 10 2006 053 660 | 5/2008 |
| EP | 1 914 433 | 4/2008 |
| EP | 1 920 964 | 5/2008 |

* cited by examiner

*Primary Examiner* — John Walters
(74) *Attorney, Agent, or Firm* — Cozen O'Connor

(57) ABSTRACT

A drive unit for a hybrid vehicle includes an internal combustion engine with a crankshaft, a friction clutch with a pressure plate, which can be moved in the axial direction by an actuating arrangement, with a clutch plate, and with a clutch disk arrangement, positioned between these first two components and is connected to the crankshaft. The drive unit also includes an electric machine, which is arranged between the internal combustion engine and the friction clutch, with a stator attached to a stator carrier and with a rotor. The friction clutch comprises a clutch hub, which serves to create at least an indirect connection of the clutch disk arrangement to the crankshaft is detachably connected to the clutch disk arrangement outside the radial dimension of the pressure plate and the clutch plate. An assembly method for assembling such a drive unit is also described, where a preassembled unit including at least the electric machine and the friction clutch is attached to an internal combustion engine.

16 Claims, 1 Drawing Sheet

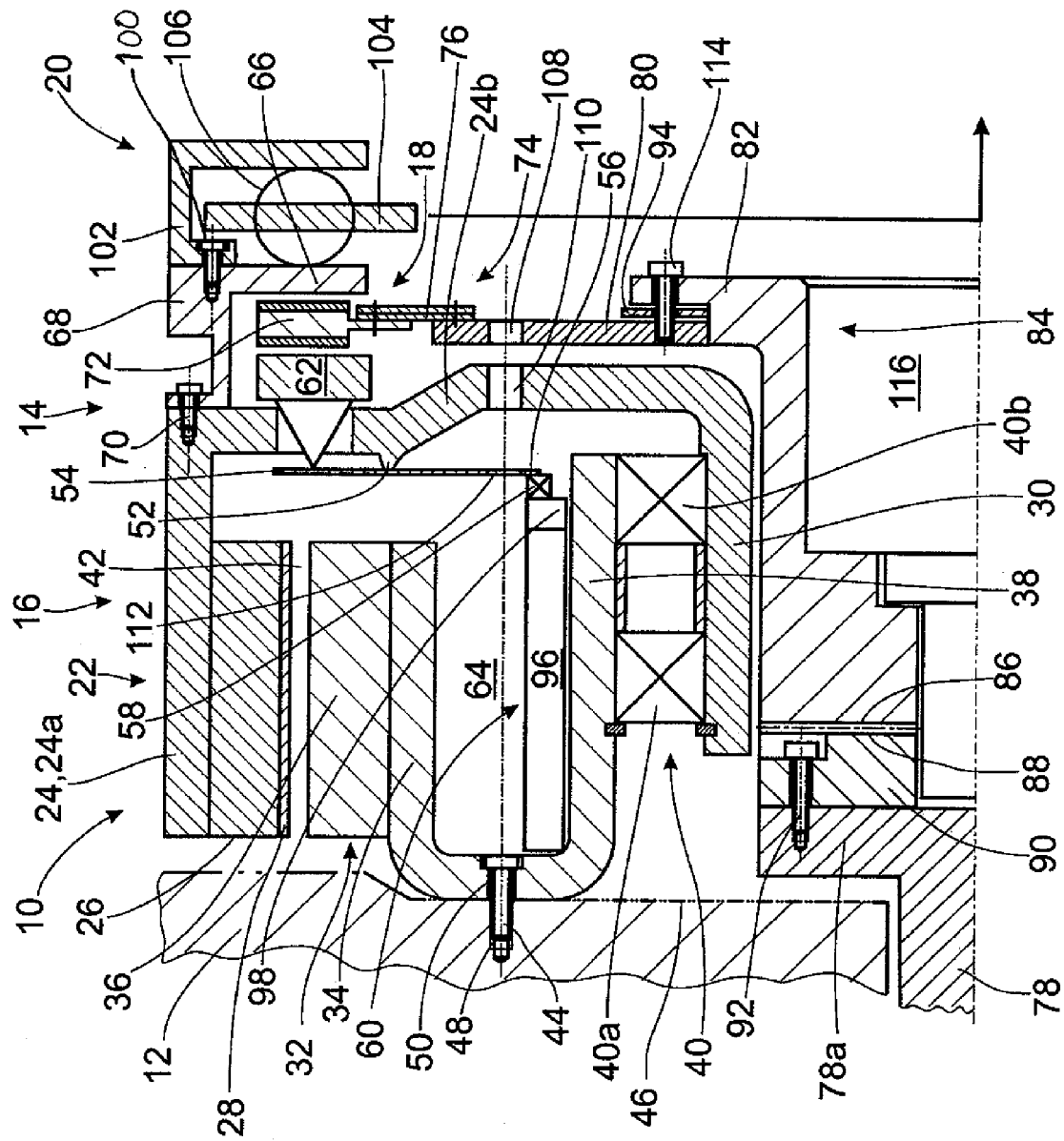

DRIVE UNIT FOR A HYBRID VEHICLE AND METHOD OF ASSEMBLY

BACKGROUND OF THE INVENTION

1. Field of the Invention

The invention pertains to a drive unit for a hybrid vehicle and to a method for the assembly of such a drive unit.

2. Description of the Related Art

A drive unit of the general type in question is already known from DE 10 2006 053 660 A1. The drive comprises an internal combustion engine, an electric machine, a friction clutch, and a torsion damper arranged in a row in the axial direction, where the clutch can be used to disconnect the takeoff shaft of the internal combustion engine from the other assemblies.

Because of the axially sequential arrangement, it is logical to undertake the assembly of the overall drive unit in the corresponding way, that is, in the order in which the components are arranged. When this approach is used, the electric machine, including the actuating device for the friction clutch, is preassembled first and then attached to the housing of the internal combustion engine. In the next step, the clutch is mounted, its clutch plate housing being connected nonrotatably to the rotor carrier of the electric machine and its friction lining disk being attached by way of a clutch hub to the crankshaft of the internal combustion engine. Then the torsion damper with its housing can be attached to the pressure plate housing of the friction clutch.

For a motor vehicle manufacturer, this assembly concept is very time-consuming and costly. It is also desirable with respect to the assembly of the entire vehicle power train to use two or more components which have been preassembled at some other manufacturing site. As a result of such preassembly the assembly work required to build the drive unit can be significantly reduced and costs decreased.

In the case of the drive unit explained above, the friction lining disk is attached axially to the crankshaft by additional elements, special attention must be paid during the assembly of the drive unit to the correct axial positioning of the clutch to guarantee that the clutch will function properly. In contrast, the friction lining disk of a conventional friction clutch is guided on the transmission input shaft so that it can be shifted axially by means of a radially toothed clutch hub, where, when the clutch is being engaged, the friction lining disk with its hub automatically adjusts itself. In the present case, however, adjusting the friction lining disk so that it is in the correct axial position requires that the disk be checked to make sure that it can move freely, and for this purpose at least the electric machine and the clutch must be attached to the internal combustion engine. In addition, insofar as it has been necessary to remove at least the clutch plate housing and possibly even the previously installed torsion damper, it will also be necessary to reinstall these elements or components after the axial position of the friction lining disk has been adjusted

SUMMARY OF THE INVENTION

An object of the invention is to provide a compact and easy-to-assemble drive unit with an internal combustion engine, an electric machine, and a friction clutch and to indicate a simple and low-cost method for its assembly.

The goal is achieved by one embodiment of the invention by a drive unit for a hybrid vehicle, which comprises:
an internal combustion engine with a crankshaft;
a friction clutch with:
a pressure plate, which can be shifted axially by means of an actuating arrangement;
a clutch plate, and
a clutch disk arrangement, positioned between the pressure and clutch plate and is connected nonrotatably to the crankshaft in an axially fixed position with respect thereto.

The drive unit also comprises an electric motor or machine, arranged between the internal combustion engine and the friction clutch, with a stator attached to a stator carrier and a rotor. This drive arrangement is characterized in that, for establishing at least an indirect connection between the clutch disk arrangement and the crankshaft, the friction clutch comprises a clutch hub, which is connected detachably to the clutch disk arrangement outside the radial dimension of the pressure and clutch plates.

It is possible to form a preassembled unit consisting of the electric machine and the clutch and to attach this to an internal combustion engine, where, as an additional element, only the clutch hub needs to be inserted. As a result of the indicated division of the clutch driver arrangement into a clutch disk arrangement and a clutch hub connected detachably thereto, it is possible to achieve a high degree of prefabrication and simultaneously to reduce the amount of work required to assemble the internal combustion engine.

A method for assembling a drive unit of this type is disclosed, where, in a first step, a preassembled structural unit is attached to the internal combustion engine by the stator carrier, whereupon, in a second step, the clutch hub is installed, this clutch hub being connected nonrotatably to the crankshaft or crankshaft adapter and to the clutch disk arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

In the following, the invention is described by way of example on the basis of the attached FIGURE.

FIG. 1 is a partial cross section of a drive unit.

DETAILED DESCRIPTION OF THE PRESENTLY PREFERRED EMBODIMENTS

FIG. 1 schematically depicts an axial cross section through a drive unit 10 for a hybrid vehicle consisting of an internal combustion engine 12 and a hybrid module 14, which comprises an electric machine 16, a shiftable clutch 18 designed as a friction clutch, and a torsion damper 20.

In the exemplary embodiment shown here, the electric motor or machine 16 is designed as a permanent magnet-excited synchronous machine of the external rotor type and comprises a cup-like rotor 22 rotating around an axis of rotation A with a rotor carrier 24, which carries on its inside circumferential surface a laminated rotor core 26 with permanent magnets 28. The radial inner area of the rotor carrier forms a rotor shaft 30 or is connected to such a shaft. The electric machine 16 also comprises a stator 32 with a stator carrier 34, on the outside circumferential surface of which a laminated stator core 36 with a stator winding (not shown in the drawing) is arranged in the known manner. The stator carrier 34 can in one embodiment have a cooling arrangement to carry away dissipation heat of the electric machine 16, especially a fluid cooling arrangement, preferably connected with the coolant circuit of the internal combustion engine 12.

As an alternative to the design with an external rotor shown here, the electric machine 16 could be of the internal rotor type and function according to some other electrical operating principle.

The rotor shaft 30, which is designed as a hollow shaft, engages axially in the central opening in a tubular bearing carrier 38, where it is supported both radially and axially. In FIG. 1, the bearing carrier 38 is designed as an integral part of the stator carrier 34. To accept the rotor 22, a bearing arrangement 40, preferably comprises a two-row roller bearing or two roller bearings 40a, 40b a certain distance axially apart, provided on the bearing carrier 38, as a result of which the rotor, forming a radial gap 42 of constant width in the circumferential direction, is supported in an operationally reliable manner with respect to the stator 32. As an alternative, the bearing carrier 38 can be designed as a part separate from the stator carrier 34 and can be attached independently of the stator carrier at least indirectly to the internal combustion engine 12.

The electric machine 16 is attached to a housing 46 of the internal combustion engine 12 by several screw bolts 44, which engage in threaded bores 48 in the housing, for which purpose several through-openings 50, distributed around the circumference and positioned to correspond to the bores, are formed in the stator carrier 34.

It can be seen in the FIGURE that the rotor carrier 24 comprises axial and radial support sections 24a, 24b, where the latter simultaneously forms part of the clutch 18. For this purpose, a diaphragm spring 54, which serves as a clutch-release element, is pivotably supported on the radial support section by way of a knife-edge 52, which extends in circular fashion in the circumferential direction. The diaphragm spring tongues 56 located in the radially inner area of the diaphragm spring 54 are in working connection with an actuating device 60 of known design by way of a clutch-release bearing 58, whereas the radially outer area of the spring is in working connection with a knife-edge contact area of a pressure plate 62. The actuating device 60, preferably designed as a hydraulically or pneumatically-working central clutch release unit, is arranged in a ring-shaped receiving space 64 extending radially between the bearing carrier 38 and the stator carrier 34 and can support itself against the bearing carrier 38 during actuation of the friction clutch 18. The friction clutch 18 also comprises a clutch plate 66, axially adjacent to the pressure plate 62. The clutch plate is designed as an integral part of a clutch housing 68, which is connected detachably to the rotor carrier 24 by screw bolts 70 or alternatively by means of, for example, a bayonet catch. In cases of a screw connection, the screws forming the joint could proceed at an angle instead of in the axial direction shown.

Axially between the pressure plate 62 and the clutch plate 66, a friction lining disk 72 with friction linings on both sides is positioned, which forms a component of a clutch disk arrangement 74. The friction lining disk 72 is preferably connected by riveting to an axially elastic area 76 of spring steel sheet, as a result of which the friction lining disk 72 can shift slightly in the axial direction with respect to the driving disk 80 when the clutch 18 is engaged. The elastic area can also undergo elastic deformation when there is an offset between the crankshaft 78 of the internal combustion engine 12 and the rotor shaft 30, and the resulting force acts on this area. The axially elastic area 76 is in turn also preferably connected by riveting to a driving disk 80, the radially inner area of which is connected detachably to a radial flange 82 of a hollow clutch hub 84. If the area 76 is omitted, the friction lining disk 72 can also be connected directly to a driving disk 80 which offers a certain limited degree of elasticity. At the end facing the crankshaft 78, the clutch hub 84 is provided with a set of radial teeth 86, which meshes with a corresponding set of teeth 88 on a crankshaft adapter 90, which is connected to the crankshaft 78 and thus serves to bridge the gap between the flange 82 and the crankshaft 78. The crankshaft adapter 90 is screwed to a radial flange 78a of the crankshaft 78 by means of several screw bolts 92 arranged on a common reference circle. The clutch hub 84 is axially pretensioned toward the crankshaft adapter 90 by a screw bolt, which is introduced through the center of the clutch hub 84 and is screwed into the crankshaft adapter, which guarantees that torque will be transmitted reliably by way of the sets of radial teeth 86 and 88. The clutch disk arrangement 74 thus comprises the friction lining disk 72, the axially elastic area 76, and the driving disk 80.

To adjust the friction lining disk 72 so that it occupies a defined axial position. In one embodiment, a spacer disk 94 is selected from a group of disks of predefined thickness stages and to insert it axially between the clutch hub 84, more precisely its radial flange 82, and the driving disk 80 during the assembly of the drive unit 10.

The actuating device 60 comprises a cylindrical housing 96, attached axially to the stator carrier 34 and/or to the bearing carrier 38, and a piston 98, which can shift position axially in the direction toward the clutch. The piston 98 carries the clutch-release bearing 58, which, as it travels outward, pivots the diaphragm spring 54 around its contact area 52, releases the load from the pressure plate 62 and shifts it toward the internal combustion engine 12, and thus opens the clutch 18. When the clutch 18 is closed the friction lining disk 72 serves as a coupling element between the crankshaft 78 on the one side and the rotor 22 and the torsion damper 20 on the other side.

The torsion damper 20, which is of known design, follows axially after the friction clutch 18. The input part of the torsion damper 20 is formed by a housing 102, attached to the clutch housing 68 by several screw bolts 100, so that the torque introduced by the input part can be transmitted to an output part, designed as a hub disk 104. To damp vibrations, several spring elements 106 are provided, which are supported at one end on the housing 102 and at the other end on the hub disk 104, and which are clamped between these two components in the circumferential direction, so that they can absorb torque surges. So that it can be connected nonrotatably to additional components of the drive unit 10, e.g., to another clutch and to a manual transmission, the hub disk 104 also comprises a set of internal teeth, the inside diameter of which is somewhat larger than the envelope circle diameter of the through-openings 50 located in the stator carrier 34, i.e., in the bearing carrier 38, for the attachment of the hybrid module 14 to the internal combustion engine 12. To accommodate the screw bolts 44, through-openings 108, 110, 112 are also provided in the driving disk 80, in the rotor carrier 24, and in the diaphragm spring 54. The number of these through-openings in each of the elements 80, 24, 54, however, is smaller than the number of screw bolts 44 to be installed and thus smaller than the number of through-openings 50 in the stator carrier 34, i.e., in the bearing carrier 38.

From the description provided so far, it can be seen that a hybrid vehicle equipped with a drive unit of this type can be driven by the internal combustion engine 12 alone, by the electric motor 16 alone, or by both units 12, 16 in combination. To start the internal combustion engine 12, it is also possible for the torque to flow in the opposite direction, that is, from the electric motor 16 to the internal combustion engine 12.

To assemble the hybrid module 14, the elements of the friction clutch 18 and of the actuating device 60 mounted on the electric machine 16 are attached to the electric machine as it is being assembled. This means that the actuating device 60 is positioned in the ring-shaped space 64 of the stator 32, and that the diaphragm spring 54 is attached to the inside surface of the rotor 22 and the clutch plate 66 to the outside surface. In a subsequent step, the rotor 22 and the stator 32 are attached to each other by the bearing arrangement 40, where the inner end 56 of the diaphragm spring 54 is brought into contact with the actuating device 58, 60. In the next step, the clutch housing 68 is connected to the rotor carrier 24, where the friction lining disk 72, which is attached to the driving disk 80, is clamped between the pressure plate 62 and the clutch plate 66. The clutch hub 84 and the spacer disk 94, if needed, are preferably not yet installed.

In yet another step, the complete torsion damper 20 is attached to the clutch housing 68.

The assembly process explained above represents only one possible variant, which is not mandatory with respect to the sequence of steps. For example, the torsion damper 20 could also be combined with the clutch housing 68, the clutch disk 72, the axially elastic element 76, and the driving disk 80 to form a subunit before the clutch housing 68 is attached to the rotor carrier 24.

To assemble the drive unit 10, the preassembled hybrid module 14 is attached to the internal combustion engine 12. For this purpose, the screw bolts 44 are inserted internally through the torsion damper hub disk 104 and through the through-openings 108, 110, 112, 50 in the driving disk 80, in the rotor carrier 24, in the diaphragm spring 54, and through some of the holes in the stator carrier 34 and then screwed into the housing 46 of the internal combustion engine 12. Because, in the example described here, the number of through-openings per element is smaller than the number of assembly openings in the stator carrier 34, the screwing-in operation proceeds by groups, where, in a first rotational position of the rotor 22, of the diaphragm spring 54 connected nonrotatably thereto, and of the driving disk 80, the through-opening openings are lined up with the first group of assembly openings, and the screw bolts can be screwed in. Then the rotor 22 is turned by a predetermined angle until the through-openings line up with the remaining assembly openings forming the second group, and the components can then be screwed to the internal combustion engine 12 by means of screw bolts through these openings. The driving disk 80, for example, can comprise only three radially outward-extending support arms for connection to the area 76, these arms defining corresponding openings between them. As a result of this arrangement, relatively large through-openings are created for the passage of the screw bolts, so that there is no need to create special assembly openings. For the temporary fixation of the relative rotational positions of the stator 32, the rotor 22, the diaphragm spring 54, and possibly the driving disk 80 before and during assembly, at least one additional opening (not shown in the FIGURE) for receiving a fastening element, e.g., a positioning pin, is provided in each of the various components.

In this state of assembly, the axial position of the friction lining disk 72 with respect to the free end of the crankshaft adapter 90 is determined, and if this deviates from the installation length of the clutch hub 84, a spacer disk 94 of suitable thickness is selected and inserted between the radial flange 82 of the clutch hub 84 and the driving disk 80. The clutch hub 84 and the driving disk 80 are connected to each other again by means of several screw bolts 114 or by means of several studs, which can be pressed into the driving disk 80. Then a pilot bearing (not shown in the drawing) for supporting a drive train shaft, e.g., an intermediate or transmission input shaft, can be pressed into the central opening 116 in the clutch hub 84. Of course, a spacer disk can, in principle, also be inserted axially between the crankshaft 78 or the crankshaft adapter 90 and the clutch hub 84 to achieve the desired axial compensation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A drive unit for a hybrid vehicle comprising:
   an internal combustion engine having a crankshaft;
   a friction clutch comprising:
      a pressure plate; and
      an actuating arrangement configured to move the pressure plate in an axial direction;
      a clutch plate;
      a clutch disk arrangement positioned between the pressure plate and the actuating arrangement, the clutch disk arrangement nonrotatably coupled to and a portion of which is fixed in axial position with respect to the crankshaft;
      a clutch hub configured to couple the clutch disk arrangement to the crankshaft; and
   an electric machine arranged between the internal combustion engine and the friction clutch, the electric machine comprising:
      a stator attached to a stator carrier; and
      a rotor,
   wherein the clutch hub is detachably connected to the clutch disk arrangement at a plurality of points axially of an inner diameter and outer diameter of inward the pressure plate and the clutch plate.

2. The drive unit according to claim 1, wherein the clutch disk arrangement comprises:
   a driving disk connected to the clutch hub; and
   a friction lining disk connected to the driving disk.

3. The drive unit according to claim 2, wherein an axially elastic area is provided between the driving disk and the friction lining disk.

4. The drive unit according to claim 2, wherein the electric machine, the friction clutch, and the actuating arrangement form a preassembled structural unit for joint attachment to the internal combustion engine,
   wherein the friction clutch comprises at least:
      the pressure plate;
      the clutch plate;
      the clutch housing; and
      the friction lining disk.

5. The drive unit according to claim 4, wherein the preassembled structural unit comprises a torsion damper.

6. The drive unit according to claim 1, wherein the clutch hub and at least one of the crankshaft and a crankshaft adapter connected nonrotatably to the crankshaft comprise sets of radial teeth, and a detachable axially connection means configured for producing a torque-transmitting connection between the clutch hub and at least one of the crankshaft and the crankshaft adapter.

7. The drive unit according to claim 1, further comprising a clutch housing, which is an integral part of the clutch plate, the clutch housing connected to the rotor of the electric machine.

8. The drive unit according to claim 7, wherein the drive unit further comprises a torsion damper, the torsion damper comprising:
   an input part of the torsion damper formed by a housing connected to the clutch housing; and
   an output part of the torsion damper formed by a hub disk.

9. The drive unit according to claim 1, wherein the rotor is supported on a bearing carrier, the bearing carrier being supported on the internal combustion engine.

10. The drive unit according to claim 9, wherein the bearing carrier is an integral part of the stator carrier.

11. The drive unit according to claim 1, wherein the friction clutch comprises an actuating device configured to actuate the friction clutch, the actuating device being arranged inside a ring-shaped space formed in the stator.

12. The drive unit according to claim 11, wherein the rotor comprises a rotor carrier, the pressure plate is arranged with freedom of axial movement on a first side of the rotor carrier, the pressure plate configured to be controlled by the actuating device from a second side of the pressure plate opposite the first side by way of at least one through-opening formed in the rotor carrier.

13. The drive unit according to claim 12, wherein the rotor carrier comprises a contact section for the pivotable support of a clutch-release element, the end of the clutch release element cooperating with the actuating device and with the pressure plate.

14. The drive unit according to claim 1 wherein the actuating arrangement comprises:
   a housing;
   a piston coupled to the housing;
   a clutch release bearing coupled to the piston; and
   a diaphragm spring coupled to the bearing, the diaphragm spring configured to be moved in an axial direction by the piston.

15. A method for assembling a drive unit, the drive unit including:
   an internal combustion engine having a crankshaft; a friction clutch having:
   a pressure plate; and an actuating arrangement configured to move the pressure plate in an axial direction; a clutch plate; a clutch disk arrangement positioned between the pressure plate and the actuating arrangement, the clutch disk arrangement nonrotatably coupled to and a portion of which is fixed in axial position with respect to the crankshaft; a clutch hub configured to couple the clutch disk arrangement to the crankshaft, wherein the method for assembling the drive unit comprises:
   arranging an electric machine between the internal combustion engine and the friction clutch, the electric machine comprising: a stator attached to a stator carrier; and a rotor,
   detachably connecting the clutch hub to the clutch disk arrangement at a plurality of points axially of an inner diameter and outer diameter of inward of the pressure plate and the clutch plate;
   forming a preassembled structural unit for joint attachment to the internal combustion engine comprising the electric machine, the actuating arrangement and at least the pressure plate, the clutch plate, the clutch housing, and the friction lining disk of the friction clutch;
   attaching the preassembled structural unit to the internal combustion engine by the stator carrier; and
   installing the clutch hub by nonrotatably connecting the clutch hub to at least one of the crankshaft and a crankshaft adapter and to the clutch disk arrangement.

16. The method for assembling a drive unit according to claim 15, further comprising:
   determining an axial distance of the clutch disk arrangement to the at least one of an assembly interface of the at least one of the crankshaft and the crankshaft adapter after the attachment of the preassembled unit to the internal combustion engine;
   selecting, based at least in part on the axial distance, a spacer disk; and
   connecting the clutch hub and the at least one of crankshaft and the crankshaft adapter to the clutch disk arrangement using the spacer disk.

* * * * *